United States Patent
Neubauer et al.

(10) Patent No.: US 7,133,572 B2
(45) Date of Patent: Nov. 7, 2006

(54) FAST TWO DIMENSIONAL OBJECT LOCALIZATION BASED ON ORIENTED EDGES

(75) Inventors: Claus Neubauer, Monmouth Junction, NJ (US); Ming Fang, Princeton Jct., NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 718 days.

(21) Appl. No.: 10/262,762

(22) Filed: Oct. 2, 2002

(65) Prior Publication Data

US 2004/0066964 A1    Apr. 8, 2004

(51) Int. Cl.
*G06K 9/20* (2006.01)

(52) U.S. Cl. .................. 382/282; 382/266; 382/278; 707/6

(58) Field of Classification Search ........... 382/258, 382/266, 269, 278, 282; 707/6
See application file for complete search history.

(56) References Cited

U.S. PATENT DOCUMENTS

| | | | | |
|---|---|---|---|---|
| 5,081,689 | A * | 1/1992 | Meyer et al. | 382/199 |
| 5,661,524 | A * | 8/1997 | Murdock et al. | 375/240.15 |
| 6,111,984 | A * | 8/2000 | Fukasawa | 382/209 |
| 6,278,798 | B1 * | 8/2001 | Rao | 382/154 |
| 6,493,465 | B1 * | 12/2002 | Mori et al. | 382/209 |

OTHER PUBLICATIONS

Borgefors G: "Hierarchical Chamfer Matching: A Parametric Edge Matching Algorithm" IEEE Transactions on Pattern Ananlysis and Machine Intelligence, IEEE Inc. New York, US. vol. 10, No. 6, Nov. 1989, pp. 849-865, XP002114858 ISSN: 0162-8828 p. 850, right-hand col. p. 851, right col., section C p. 858.

Neubauer C et al: "Performance comparison of feature extraction methods for neural network based object recognition" 2002, Piscataway, NJ, USA, IEEE, USA, May 2002, pp. 1608-1613 vol., ISBN: 0-7803-7278-6 section IV.

Andrew W. Filtzgibbon: "Robust Registration of 2D and 3D Point Sets" Proceedings British Machine Vision Conference, 'Online! 2001, pp. 411-420, XP002285676 Retrieved from the Internet: URL:http://www.bmva.ac.uk/bmvc/2001/papers/411accepted_41.pdf> 'retrieved on Jun. 22, 2004! Section 2.1.

(Continued)

*Primary Examiner*—Jingge Wu
*Assistant Examiner*—Yosef Kassa
(74) *Attorney, Agent, or Firm*—Donald B. Paschburg; F. Chau & Associates, LLP

(57) ABSTRACT

A method for object localization comprises defining an edge model for object localization, and searching an image for an object matching the edge model. Searching comprises defining a region of interest, including a portion of the object, sub-sampling the region of interest, and extracting an edge image comprising edges from the region of interest. Searching further comprises thinning at least one edge of the edge image, determining a distance map between the image and the edge image according to a distance transformation, and matching the edge model to the edge image within a search area defined according to the distance map.

20 Claims, 4 Drawing Sheets

OTHER PUBLICATIONS

Gavrila D M Ed—Jain A K et al: "Multi-feature hierarchial template matching using distance transforms" Pattern Recognition. 1998, Proceedigns. Fourteenth International Conference on Brisbane, Old., Australia Aug. 16-20, 1998. Los Alamitos, CA, USA, IEEE Comput. Soc, US, Aug. 16, 1998. pp. 439-444, XP010297649 ISBN: 0-8186-8152-3 figure 2 sections 2.1, 3.1.

WO 96/39678 A (Shell Oil Co) Dec. 12, 1996, p. 4—p. 5.

You J et al: :Efficient Image Matching: A Hierachical Chamfer Matching Scheme Via Distributed System Real-Time Imaging, Academic Press Limited, G8, vol. 1, No. 4, Oct. 1995, pp. 245-259, XP004419690 ISSN: 1077-2014 p. 248, right-hand col. p. 249, right-hand col., line 10- line 26 figure 5.

Paul J. Besl et al., "A Method for Registration of 3-D Shapes", IEE Transactions of Pattern Analysis and Machine Intelligence, vol. 14, No. 2, Feb. 1992.

* cited by examiner

US 7,133,572 B2

FAST TWO DIMENSIONAL OBJECT LOCALIZATION BASED ON ORIENTED EDGES

BACKGROUND OF THE INVENTION

1. Field of the Invention

The present invention relates to computer vision, and more particularly to, a method of feature based two-dimensional object localization.

2. Discussion of Related Art

Fast object localization is an important part of inspection systems. The majority of localization methods rely on normalized template matching of a gray value pattern. Gray value pattern matching has several disadvantages. For example, template matching is relatively slow, and the speed can be exacerbated if a search range is large or if the method needs to be tolerant of object rotation. Further, template matching is sensitive to illumination changes that cannot be compensated by normalization with respect to brightness and contrast.

There are approaches that aim to accelerate the matching operation in the grayscale domain by using multi-resolution techniques or hierarchical search methods. However, these approaches can be unstable with respect to illumination change.

Therefore, a need exists for a system and method of edge extraction that is stable with respect to changes in illumination.

SUMMARY OF THE INVENTION

According to an embodiment of the present invention, a method for object localization comprises defining an edge model for object localization, and searching an image for an object matching the edge model. Searching comprises defining a region of interest, including a portion of the object, sub-sampling the region of interest, and extracting an edge image comprising edges from the region of interest. Searching further comprises thinning at least one edge of the edge image, determining a distance map between the image and the edge image according to a distance transformation, and matching the edge model to the edge image within a search area defined according to the distance map.

The distance map defines a distance for each pixel of the image to a nearest edge pixel of the edge image.

Matching further comprises determining an error measure according to a distance to a next image edge pixel and a difference in edge orientation. Matching further comprises matching the edge model in a plurality of rotations to the edge image. The method further comprises determining an error for each rotation of the edge model relative to the edge image. Determining an error further comprises determining a distance to a next image edge pixels for each model edge point, determining a difference in edge orientation of corresponding pixels for each model edge, and truncating the distance to the next image edge pixels and the difference in edge orientation. Determining the error further comprises scaling the distance to the next image edge pixels and the difference in edge orientation to a given interval, determining a relative weight of the distance to the next image edge pixels and the difference in edge orientation, and determining an error as a summation of a matching error over all model edge points.

Defining the edge model comprises defining a region of interest, including a portion an object to be trained, sub-sampling the region of interest, extracting a edge model image comprising edges from the region of interest, thinning at least one edge of the edge model image, and selecting a number of edge pixels, wherein a selected set of edge pixels comprises the edge model. The method further comprises determining a plurality of rotated edge models corresponding to the edge model rotated in discrete steps.

The method comprises matching the edge model to the edge image by iterative closest point. Matching the edge model to the edge image by iterative closest point comprises determining, for each pixel in the edge model, a closest edge pixel of the edge image in a corresponding search area, determining transformation parameters, wherein the transformation parameters minimize a distance between the edge model and the edge image, according to a sum distance of a plurality of pixels of the edge model to a plurality of pixels of the edge image, and correcting a position of the model according to the transformation parameters.

According to an embodiment of the present invention, a program storage device is provided, readable by machine, tangibly embodying a program of instructions executable by the machine to perform method steps for object localization.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

A method for feature based two dimensional object localization in a gray scale image can be based on a determination of an oriented edge representation of one or more objects (an edge image). For a given edge image, in a preprocessing stage sub-sampling, smoothing and edge filtering can be performed. The edges can be thinned. Edge orientation and length of edge segments can be determined for the edge image. A distance transformation can be determined on the edge image. A matching method, taking point distance as well as edge orientation into account, determines a position and an orientation of one or more objects in the gray scale image even in the presence of heavy clutter.

In contrast to area-based algorithms, according to an embodiment of the present invention, an object search is not carried out based on gray value images, but is based on edge features. Edges are more stable with respect to changes in illumination within a gray scale image. Thus, edges result in a smaller object representation than area or template based solutions and enable improved matching (e.g., faster). While other edge based localization methods rely merely on the edge location, according to an embodiment of the present invention local edge orientation is explicitly incorporated in the matching process. Thus, a false positive rate in cluttered scenes can be significantly reduced.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
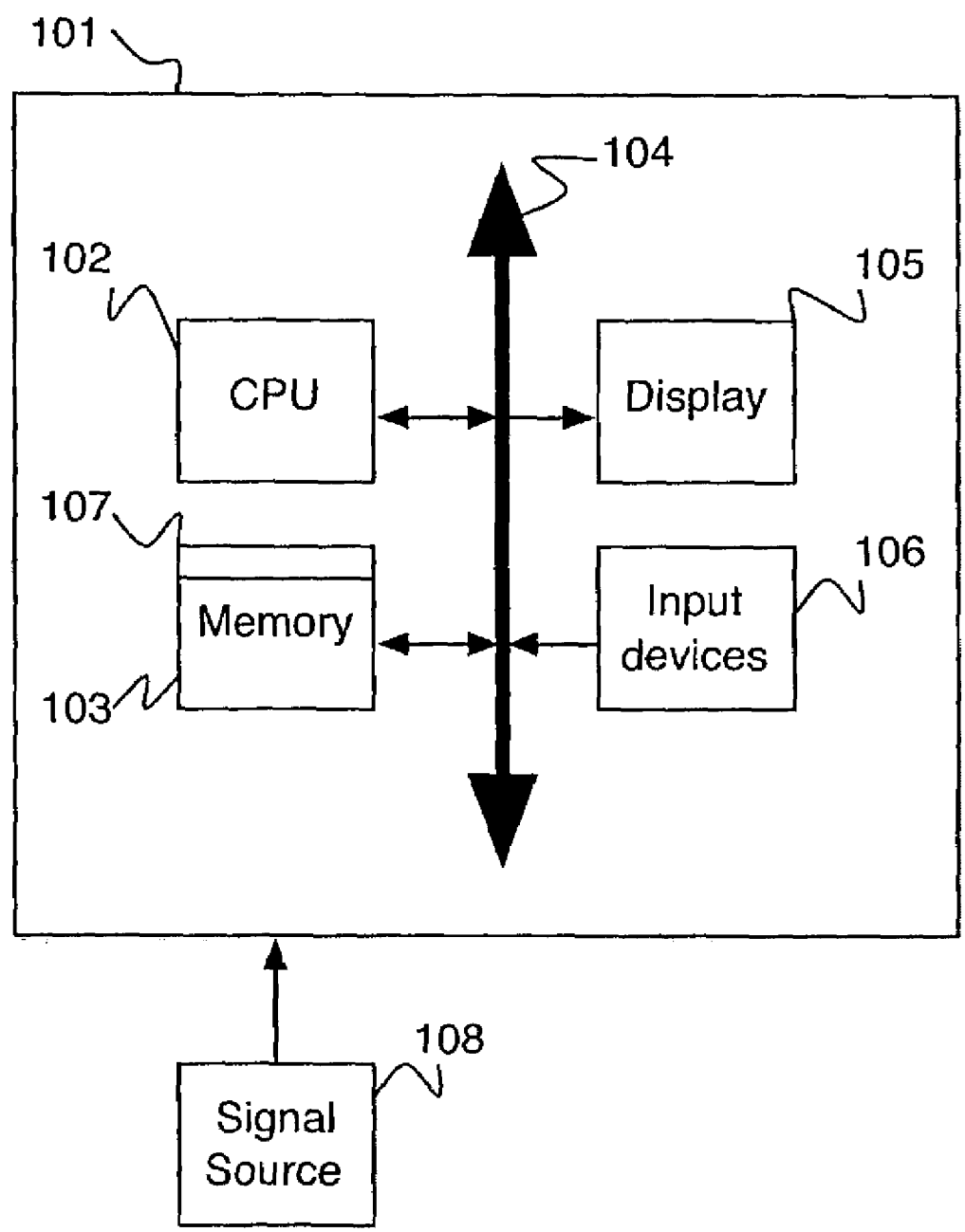
FIG. 1 is a diagram of a system according to an embodiment of the present invention.

Referring to FIG. 1, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108, for example a camera capturing an image including a region of interest. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figures 2A, 2B:
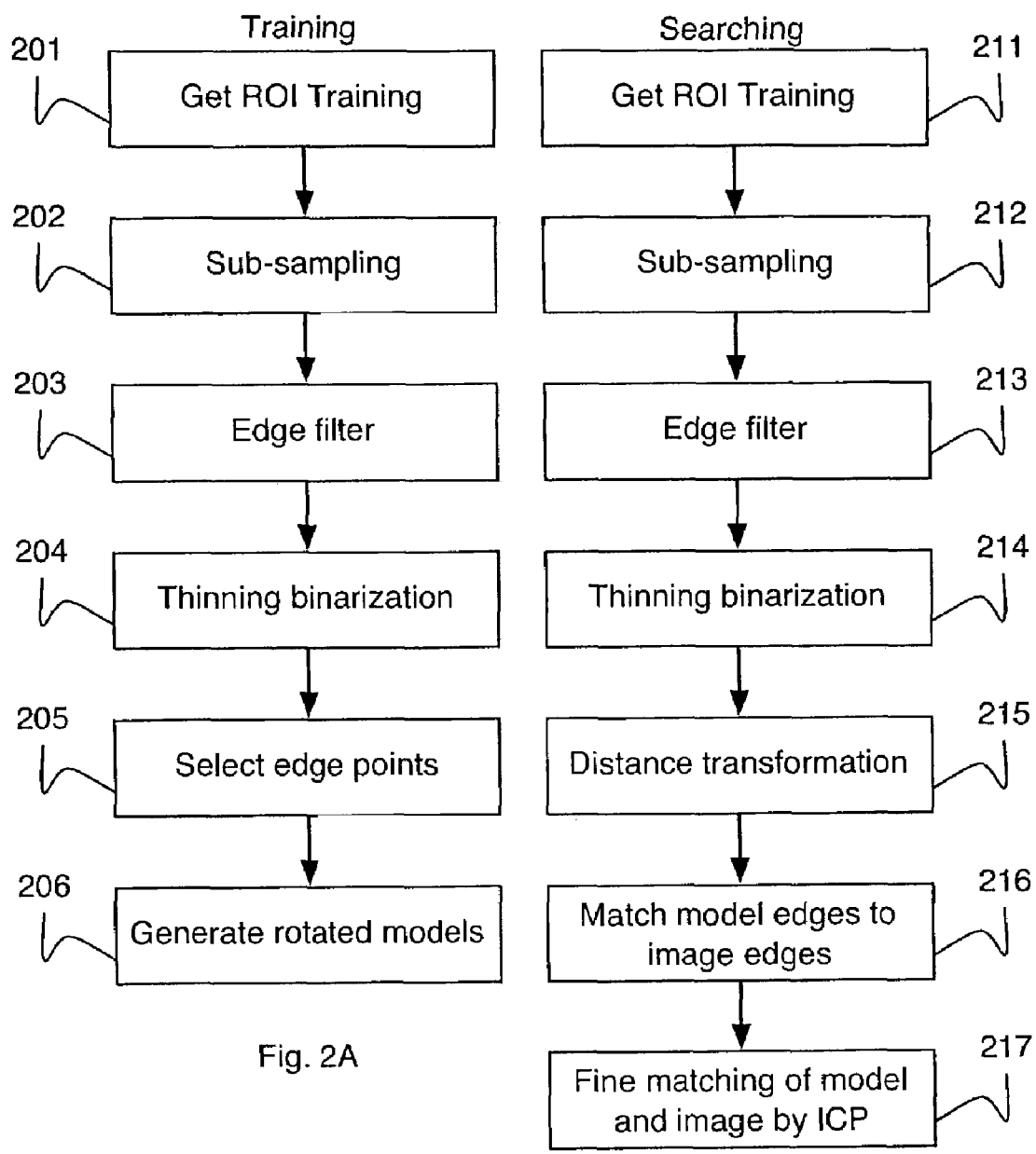
FIG. 2A is a flow chart of a method of training a two dimensional object localization system according to an embodiment of the present invention.
FIG. 2B is a flow chart of a method of searching in a two dimensional object localization system according to an embodiment of the present invention.

Referring to FIG. 2A, in a training phase a region of interest (ROI), including the object to be trained, can be extracted 201 and sub-sampled 202. An edge filter can be applied 203 that determines the partial derivatives in horizontal and vertical directions. The edges can be thinned to obtain lines with about one pixel width 204. An object can be created based on a subset of edge points 205, wherein edge points are a sub-sample of edge pixels. Different orientations of the object can be treated as different models 206. Therefore, the object can be rotated in discrete steps and the edge point sets can be stored for later matching.

In the search phase, shown in FIG. 2B, the preprocessing can be applied to a search area. Preprocessing comprises extracting a region of interest 211, sub-sampling 212, edge filtering 213 and thinning 214. A distance transformation can be determined 215 based on the binary edge image. A search can take place for matching model edge points with image edge pixelss in the search area 216 and returning matches that are above a predetermined confidence threshold.

Referring to the preprocessing and edge extraction, before edges can be extracted, the resolution of the image can be reduced by sub-sampling the image to speed up a subsequent edge filter and matching method. The resolution can be reduced by a factor n. For example, n=2 means that 2×2 pixel blocks are averaged and merged into one pixel. Since a larger n reduces the accuracy of the localization, the choice of n is guided by a tradeoff between execution speed and localization accuracy.

The resolution can be fixed. One extension of choosing a fixed resolution is to perform a coarse localization at a lower resolution (large n). Once an object has been found at a low resolution a more accurate local search can be performed at a higher resolution in the local neighborhood of the found object. Thus, the object can be localized with high accuracy without having to search the whole image at the high resolution. If a localization accuracy in the sub-pixel range is needed or if the rotation angle is to be determined with an accuracy better than the angle difference of the stored object models, then a fine localization method based on an ICP (Iterative Closest Point) methodology can be implemented to refine the coarse localization.

Figure 3A:
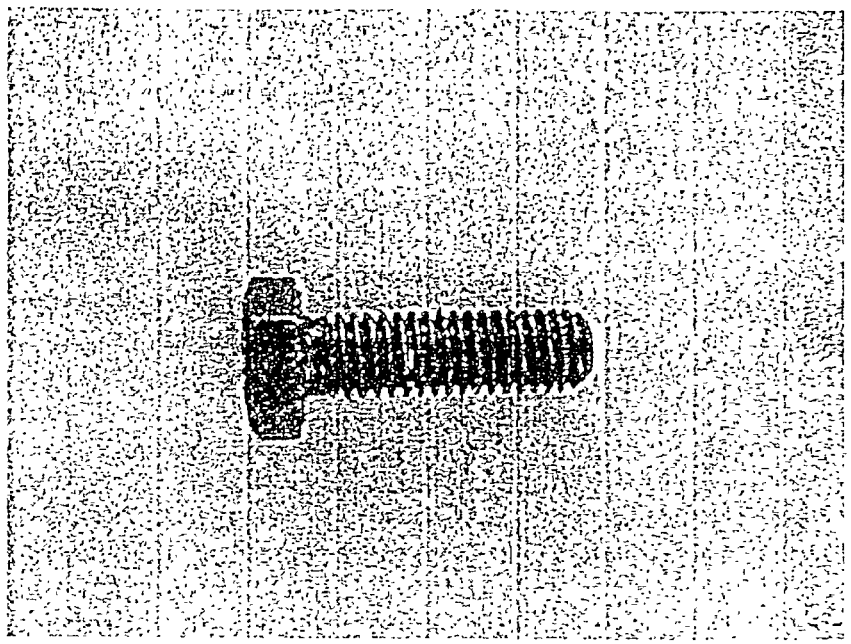
FIG. 3A is a training image according to an embodiment of the present invention.

The edge filter is similar to a Canny edge filter, however, several modifications can be incorporated to accelerate the method. Edge filtering can cause aliasing if structures with high spatial frequency are present. To avoid aliasing, an image (e.g., as shown in FIG. 3A) can be smoothed by a low pass filter before edge filtering. For edge filtering 3×3, 5×5 or 7×7 filter masks are used. The choice of the size of the filter kernel can depend on the structure of the object. If the features that are characteristic for the training object are edges with sharp details a smaller kernel is better suited that emphasizes on small structures. If the edges are smooth, a larger kernel is better suited. In addition, if the object or parts of the object contain texture with a high spatial frequency a larger kernel is advised to reduce random texture edges and keep them from deteriorating the localization.

Two filter masks can be applied, which correspond to a partial derivative in x- and y-directions: a first filter responds to horizontal edge structure and a second filter responds to vertical edge structures. From both partial derivatives dx, dy the intensity l(x,y) of the edges and the edge direction Phi(x,y) can be derived:

$l(x,y)=Sqrt(dx(x,y)^2+dy(x,y)^2)$;

$Phi(x,y)=ArcTan(dx(x,y)/dy(x,y))$;

In a speed optimized implementation the convolution with two dimensional filter kernels can be replaced by two one-dimensional kernels since the kernels are separable.

Figure 3B:
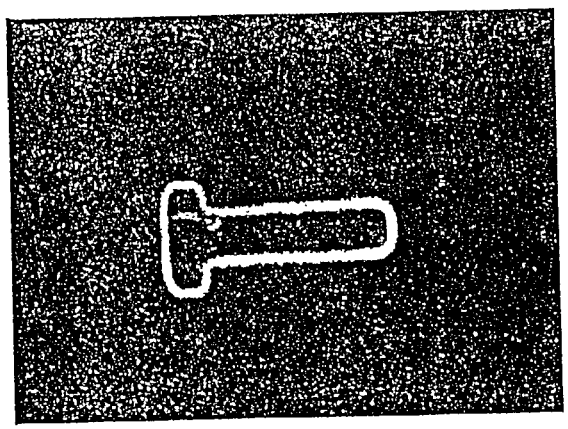
FIG. 3B is a view of the training image of FIG. 3A, wherein an edge filter has been applied according to an embodiment of the present invention.

The images resulting from edge filtering, e.g., as shown in FIG. 3B include broad lines with a width of several pixels. To reduce the search space, the width of the lines can be thinned, for example, to one pixel. This can be achieved by evaluating the local edge strength in the direction perpendicular to the line direction. The pixel with the maximum local edge strength is selected as the center pixel of the line while all other edge pixels are erased.

Figure 3C:
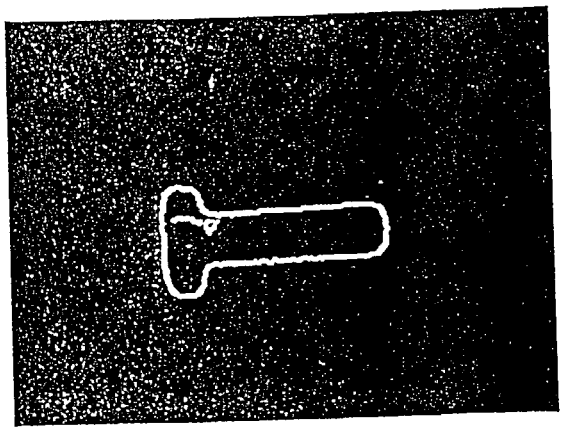
FIG. 3C is a view of the training image of FIG. 3A, wherein the training image has been thinned and binarized, and an edge filter has been applied according to an embodiment of the present invention.

The edge image can be binarized by setting all remaining pixels below a threshold to zero while all edge pixels above a threshold are set to one. FIG. 3C shows an edge image that has been thinned and binarized.

The length of any remaining line segments can be determined. Again, a threshold can be defined and line segments below the threshold (e.g., those likely to be caused by noise) can be erased.

Referring now to the training of the object model, one objective of object training is to extract relevant edges for later matching. Referring to FIG. 2, an image of an object is taken, preferably with homogeneous background, and the user can mark a region of interest 201, for example, a rectangular area including the object. The region of interest does not need to contain the whole object. Instead, a sub-region can be better suited in some instance, e.g., where speed is a priority, for localization if it includes significant edges. The region of interest can be sub-sampled 202 and edges are extracted 203 as described above so that a binary edge image comprising line segments is obtained. If the edge image includes only a few edge pixels, a warning can be generated and the user can specify a different region of interest. On the other hand, if the edge image includes many edges, not all edge pixels are used. Instead, a subset of these edge pixels can be randomly selected 205 to limit the size of the object model and prevent a slow down of the matching method. According to an embodiment of the present invention, the maximum number of edge pixels can be limited, for example, to 100.

Once an edge model of the training object is established, the model can be further improved by incorporating user feedback. With the help of a drawing tool, such as a digital tablet and imaging application, the user can correct the edge representation. The user can add missing lines and/or erase misleading edges caused by noise or shadows.

There are several parameters that can be manually adjusted before training, including for example:

Limitation of the angle range for object rotation;

Specification of the region of interest, sub sampling factor and edge filter width;

Specification of minimum and maximum number of model edge pixels; and

Specification of a threshold for edge intensity.

To deal with object rotation, the previously generated object model comprising a set of edge points can be rotated in discrete angle steps 206, for example, by one grad. The rotated point sets are pre-determined and stored during training so that they can be retrieved during runtime without the need to determine a matrix multiplication for each point. The edge points for each rotation angle can be stored in an array. The order of the pixels is randomly chosen with exception of the first two points. The first two points should not by very close to each other. If the first two points are far away from each other the speed of the matching can be improved, because at an early stage many configurations can be ruled out.

Referring to the method of searching for objects, one objective of search is to find all locations where edge pixels in the search image closely match the trained point set. Since an exhaustive search at each location with arbitrary object orientation is computationally expensive, a search strategy is needed to speed up the search. According to an embodiment of the present invention, the distance transformation can be implemented as a search strategy. Once a region of interest is defined 211, the image can be sub-sampled 212 and the binary edge image can be obtained 213 & 214 as described above. The distance transformation can be determined 215.

Regarding the distance transformation, the result of the distance transformation creates a secondary image (distance map), where the Euclidean distance to the nearest edge pixel can be assigned to each pixel. Thus, after applying the distance transformation, pixels that coincide with an edge can be assigned the value zero, while each pixel not coinciding will an edge can be assigned a positive value according to a distance from the next edge. For object matching only small distances below a predetermined or desired threshold are relevant (truncated distance transformation).

The truncated distance transformation can be implemented as a local window operator that needs to be applied only to edge pixels in the image. If for example, the maximum distance needed for matching is three, a 7×7 window of operation is applied to all edge pixels, that is three pixels or points surrounding each edge pixel in each direction (e.g., horizontal and vertical).

For an implementation of the general distance transformation (not truncated) the Champfer distance can be used as an approximation of the Euclidean distance. This allows for a calculation of the complete distance map with a fast two pass algorithm based on 3×3 or 5×5 windows depending on the desired accuracy of the approximation.

Figure 4:
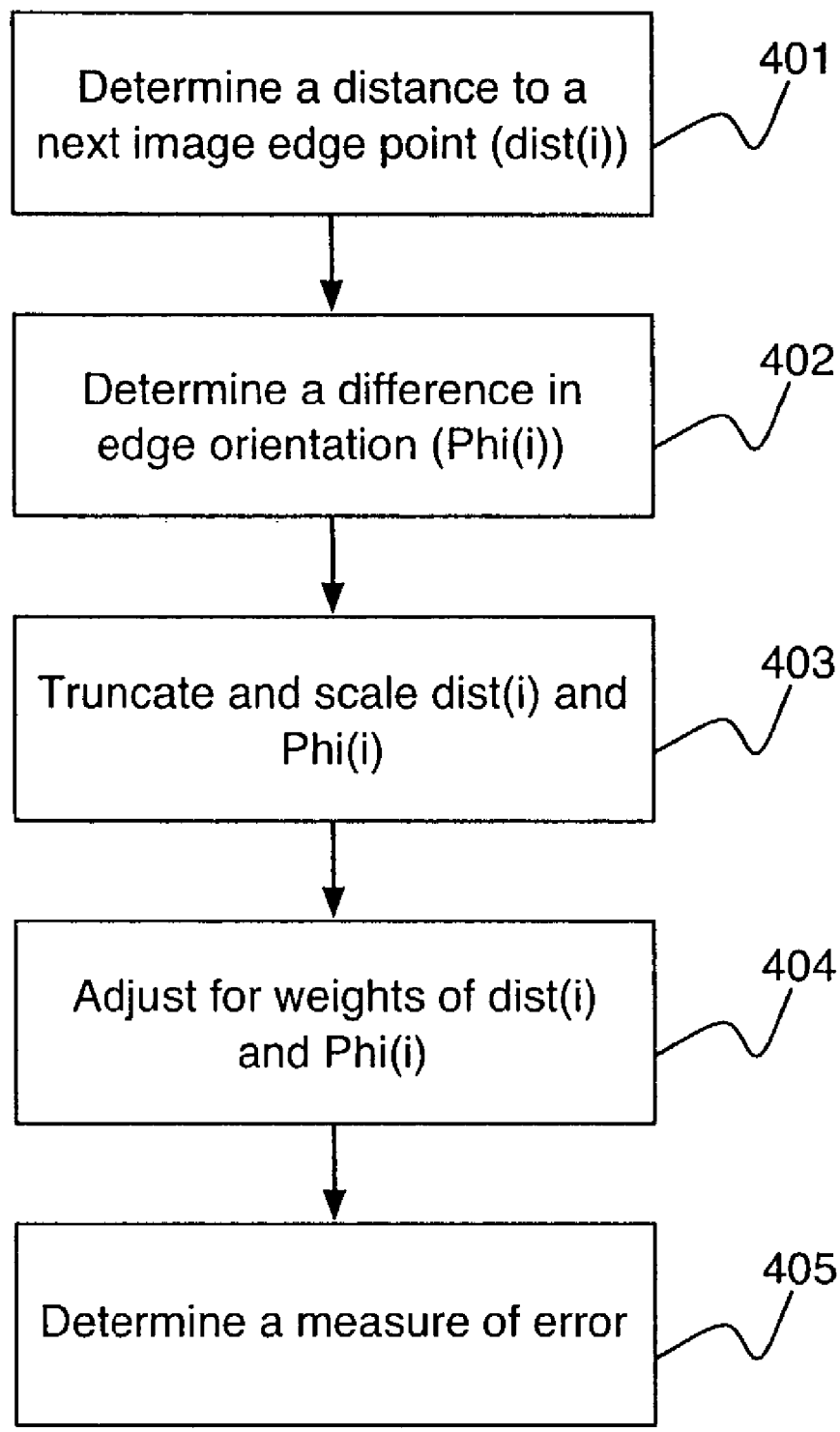
FIG. 4 is a flow chart for a method of determining an error according to an embodiment of the present invention.

The matching method 216 is faster than an exhaustive search. The improvement in matching speed as compared to an exhaustive search can be achieved by considering only image edge pixelss as candidates for possible matches. Thus, the trained point set is moved to each edge pixel in the image such that the first point of the point set exactly coincides with an edge pixel. All other positions need not be examined. Further, an error measure can be determined for the match at each candidate point. Referring to FIG. 4, for every model edge point the distance to the next image edge pixels (dist(i)) is retrieved 401 making use of the above distance map and in addition the difference in edge orientation (Phi(i)) of corresponding pixels is retrieved 402. Both values can be truncated and scaled to the interval [0,1] 403. $T_{dist}$, $T_{Phi}$ are thresholds that can be used to truncate the error and their relative size defines the relative weight of distance and orientation mismatch 404. Summation of the matching error E(i) over all N model edge points yields the overall error E at a particular location 405:

$E_{dist}(i)=\min(1,dist(i)/T_{dist})$ $E_{dist}(i)$ truncated and scaled distance of point i[0,1]

$E_{Phi}(i)=\min(1,Phi(i)/T_{Phi})$ $E_{Phi}(i)$ truncated and scaled edge orientation difference [0,1]

$E(i)=(E_{dist}(i)+E_{Phi}(i))/2$

E(i) Error of point 1 [0,1]

$E=\Sigma E(i)/N$

E Average error over all points [0,1]

E=1 means perfect mismatch and E=0 is a perfect match. The error can be transformed into a confidence value.

C=(E−1)×100

C confidence value between [0,100]

The user specifies a confidence threshold to eliminate poor matches. A threshold T=80 means that 80% of the edge pixels are to be in correspondence with the image so that the object is detected. While a default of about 70–80% produces good results, the user can modify this parameter to control the detection rate and false positive rate. If the background is cluttered a higher threshold is advised to reduce false positives. If background is homogeneous, a lower threshold will reduce the probability of missing an object.

When the error is determined as described above, a second measure for increasing matching speed can be implemented. The error calculation can be stopped as soon as the average error becomes greater than the error threshold and this position can be eliminated. This results in a significant performance gain since most candidate locations can be ruled out after examining a few model points instead of the whole point set.

The matching method described thus far depends on the presence of the first feature point. If this point is not present in the image due to local occlusion, the match is not detected even if the rest of the feature points are present. This problem can be solved by using multiple models with different starting points, but this can slow down the matching. Instead, according to an embodiment of the present invention the problem with occlusions can be solved by choosing a different random order of the feature points for each rotated model (determined during training). If an object is not detected because the first point is not found it can still be detected because the model at an angle Phi +/−1 Grad matches. It matches because its first point is somewhere else on the object boundary and therefore unlikely to be occluded, too.

It is likely that in the neighborhood of an optimal match x,y,Phi there are a number of other locations that fit also quite well, thus a method of eliminating double counts can be implemented. A simple elimination procedure can be applied to ensure that each object is detected only once. At any time the search procedure maintains a list of all objects already found together with their position and confidence. If a new object is detected it is compared with the current object list. If its center is close to another object only the one with higher confidence is kept. If it is far enough away from all other positions it is added to the object list.

Experiments with various objects in the presence of background clutter and with variable illumination have demonstrated the robustness of the proposed algorithm for two dimensional object detection and localization. On a 500 Mhz Pentium III personal computer the edge preprocessing takes about 20 ms on a 640×480 image if the sub-sampling parameter n is set to two. The search time can depend on various factors. If 360 Grad object rotation is enable localization takes 20–50 ms. By limiting the angle range the search time is proportionally reduced.

The matching described so far retrieves the location of each object in the scene with an accuracy that depends on the pixel size and on the angle resolution (e.g., the discrete angles in which the object model is stored). To obtain sub-pixel accuracy the result of the first matching can be used as an estimation to be refined in a subsequent fine localization. As depicted in FIG. 2B, for fine localization an ICP (Iterative Closest Point) methodology can be implemented 217. ICP was developed for matching of 3D-point sets.

For ICP the edge point model can be initially placed in the search image at the location determined by the coarse matching. For each model point, the closest edge point in the scene is determined. This can be achieved conveniently without further computation by making use of the distance transformation determined previously. Once the point correspondences are established, the transformation parameters (e.g., position, angel and scale) that minimize the overall distance between the image point set and the model point sets can be determined. The model's position can be corrected accordingly. The method can be repeated by determining a new point correspondences and new transformation parameters until a desirable (e.g., optimal) match is determined and no further improvement is possible. The method can converge quickly (e.g., in less than ten iterations) and does not significantly increase the overall search time because it is applied at a few points in the image, where the coarse localization has found an object.

Since the fine matching method iteratively "locks in" on the object, the parameters of the coarse matching step can be relaxed (e.g., by using larger angle step size). This in turn to improves the over all search time because less models need to be matched during the first localization.

While the present invention can be implemented to detect and localize an object class, it can be extended to recognize and discriminate different object classes. For example, if several different objects need to be discriminated, a localizer can be trained for each object class and in the search phase each localizer can be applied simultaneously to the search region for trained objects together with a location and matching score.

The system and method of the present invention has many potential applications. For example, localization of an object to normalize the position before further measurements take place (e.g., distance measurements, check of completeness). Further, the integrity of an object (i.e. the correspondence with the trained object) can be determined via the matching score. The method is well suited for sorting applications since it can be applied for multiple object classes and can determine objects irrespective position and orientation, for example, where objects move along on a conveyor belt. In addition, the speed of the object search means that the system and method is well suited for implementation with, for example, smart cameras with limited computational power (Smart cameras are cost efficient and can be more easily integrated into the production process than PC based machine vision solutions).

Having described embodiments for a method front propagation flow for boundary extraction, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for object localization comprising the steps of:
   defining an edge model for object localization;
   searching an image for an object matching the edge model comprising the steps of:
   defining a region of interest, including a portion of the object;
   sub-sampling the region of interest;
   extracting an edge image comprising edges from the region of interest;
   thinning at least one edge of the edge image;
   determining a distance map between the image and the edge image according to a distance transformation; and
   matching the edge model to the edge image within a search area defined according to the distance map.

2. The method of claim 1, wherein the edge image comprising edges is sub-sampled to extract model edge points.

3. The method of claim 1, wherein the distance map defines a distance for each pixel of the image to a nearest edge pixel of the edge image.

4. The method of claim 1, wherein the step of matching further comprises the step of determining an error measure according to a distance to a next image edge pixel and a difference in edge orientation.

5. The method of claim 1, wherein the step of matching further comprises the step of matching the edge model in a plurality of rotations to the edge image.

6. The method of claim 5, further comprising the step of determining an error for each rotation of the edge model relative to the edge image.

7. The method of claim 6, wherein determining an error further comprises the steps of:
 determining a distance to a next image edge pixels for each model edge point;
 determining a difference in edge orientation of corresponding pixels for each model edge;
 truncating the distance to the next image edge pixels and the difference in edge orientation;
 scaling the distance to the next image edge pixels and the difference in edge orientation to a given interval;
 determining a relative weight of the distance to the next image edge pixels and the difference in edge orientation; and
 determining an error as a summation of a matching error over all model edge points.

8. The method of claim 1, wherein defining the edge model comprises the steps of:
 defining a region of interest, including a portion an object to be trained;
 sub-sampling the region of interest;
 extracting a edge model image comprising edges from the region of interest;
 thinning at least one edge of the edge model image; and
 selecting a number of edge pixels, wherein a selected set of edge pixels comprises the edge model.

9. The method of claim 8, further comprising the step of determining a plurality of rotated edge models corresponding to the edge model rotated in discrete steps.

10. The method of claim 1, further comprising the step of matching the edge model to the edge image by iterative closest point, comprising the steps of:
 determining, for each pixel in the edge model, a closest edge pixel of the edge image in a corresponding search area;
 determining transformation parameters, wherein the transformation parameters minimize a distance between the edge model and the edge image, according to a sum distance of a plurality of pixels of the edge model to a plurality of pixels of the edge image; and
 correcting a position of the model according to the transformation parameters.

11. A program storage device readable by machine, tangibly embodying a program of instructions executable by the machine to perform method steps for object localization, the method steps comprising:
 defining an edge model for object localization;
 searching an image for an object matching the edge model comprising the steps of:
 defining a region of interest, including a portion of the object;
 sub-sampling the region of interest;
 extracting an edge image comprising edges from the region of interest;
 thinning at least one edge of the edge image;
 determining a distance map between the image and the edge image according to a distance transformation; and
 matching the edge model to the edge image within a search area defined according to the distance map.

12. The method of claim 11, wherein the edge image comprising edges is sub-sampled to extract model edge points.

13. The method of claim 11, wherein the distance map defines a distance for each pixel of the image to a nearest edge pixel of the edge image.

14. The method of claim 11, wherein the step of matching further comprises the step of determining an error measure according to a distance to a next image edge pixel and a difference in edge orientation.

15. The method of claim 11, wherein the step of matching further comprises the step of matching the edge model in a plurality of rotations to the edge image.

16. The method of claim 15, further comprising the step of determining an error for each rotation of the edge model relative to the edge image.

17. The method of claim 16, wherein determining an error further comprises the steps of:
 determining a distance to a next image edge pixels for each model edge point;
 determining a difference in edge orientation of corresponding pixels for each model edge;
 truncating the distance to the next image edge pixels and the difference in edge orientation;
 scaling the distance to the next image edge pixels and the difference in edge orientation to a given interval;
 determining a relative weight of the distance to the next image edge pixels and the difference in edge orientation; and
 determining an error as a summation of a matching error over all model edge points.

18. The method of claim 11, wherein defining the edge model comprises the steps of:
 defining a region of interest, including a portion an object to be trained;
 sub-sampling the region of interest;
 extracting a edge model image comprising edges from the region of interest;
 thinning at least one edge of the edge model image; and
 selecting a number of edge pixels, wherein a selected set of edge pixels comprises the edge model.

19. The method of claim 18, further comprising the step of determining a plurality of rotated edge models corresponding to the edge model rotated in discrete steps.

20. The method of claim 11, further comprising the step of matching the edge model to the edge image by iterative closest point, comprising the steps of:
 determining, for each pixel in the edge model, a closest edge pixel of the edge image in a corresponding search area;
 determining transformation parameters, wherein the transformation parameters minimize a distance between the edge model and the edge image, according to a sum distance of a plurality of pixels of the edge model to a plurality of pixels of the edge image; and
 correcting a position of the model according to the transformation parameters.

* * * * *